United States Patent [19]
Komazaki

[11] 3,791,723
[45] Feb. 12, 1974

[54] MOTION PICTURE APPARATUS
[75] Inventor: Tosio Komazaki, Tokyo, Japan
[73] Assignee: Action Films, Inc., Mountain View, Calif.
[22] Filed: Nov. 1, 1972
[21] Appl. No.: 302,742

[52] U.S. Cl. ............................ 352/72, 352/129
[51] Int. Cl. .................................... G03b 21/00
[58] Field of Search ............... 352/72, 78, 129, 242

[56] References Cited
UNITED STATES PATENTS
| | | | |
|---|---|---|---|
| 3,706,439 | 12/1972 | Skinner | 352/78 R |
| 2,008,110 | 7/1935 | Scheibell | 352/72 X |
| 2,241,231 | 5/1941 | Wittel | 352/72 |
| 3,074,311 | 1/1963 | Kapilow | 352/129 |

Primary Examiner—Samuel S. Matthews
Assistant Examiner—Alan Mathews
Attorney, Agent, or Firm—Flehr, Hohbach, Test, Albritton & Herbert

[57] ABSTRACT

Motion picture apparatus for use with a removable cartridge having a housing with a cavity formed therein for receiving the cartridge. The housing is provided with a side wall which has a drive member carried thereby. The side wall is formed to permit the portion of the side wall carrying the drive member to be deformed outwardly so as to permit a driving member carried by the cartridge to move over the drive member and to engage the drive member so that the drive member drives a driven member as the drive member is rotated.

6 Claims, 6 Drawing Figures

MOTION PICTURE APPARATUS

BACKGROUND OF THE INVENTION

In U.S. application for Letters Patent, Serial No. 867,289, filed Oct. 17, 1969 now U.S. Pat. No. 3,706,439, there is disclosed a motion picture viewer in which yieldable spring means is provided within the housing which is adapted to be deformed to permit the cartridge to be inserted in the housing and still permit the driven member carried by the cartridge to move over the drive member carried by the housing and to engage the same. It has been found that it has been difficult for children, and even adults, to remove the cartridge from a housing having such a construction. In addition, such a housing and construction has been relatively expensive. There is, therefore, a need for a new and improved motion picture apparatus which will overcome the above-named disadvantages.

SUMMARY OF THE INVENTION AND OBJECTS

The motion picture apparatus is for use with a removable cartridge of the type having an aperture, a length of film disposed of in the cartridge and means including a driven member exterior of the cartridge for advancing the film past the aperture in the cartridge. The viewer comprises a housing having a cavity formed therein with the rear opening in communication with the cavity whereby the cartridge can be inserted into the cavity and removed from the cavity through the rear opening. An optical assembly is mounted on the housing in front of the aperture in the cartridge when the aperture is in the cavity to permit images to be formed in the optical assembly of the film as it is advanced in the cartridge. The housing has a side wall. A drive member is carried by a portion of the side wall of the housing. The side wall is formed to permit the portion of the side wall carrying the drive member to be deformed outwardly so as to permit the driven member carried by the cartridge to move over the drive member and engage the drive member so that the drive member drives the driven member as the drive member is rotated.

In general, it is an object of the present invention to provide a motion picture apparatus for use with a removable cartridge which can be inexpensively produced.

Another object of the invention is to provide a motion picture apparatus of the above character which has fewer parts and is relatively simple to manufacture.

Another object of the invention is to provide a motion picture apparatus of the above character in which the cartridge can be readily inserted and removed by movement in a straight line.

Another object of the invention is to provide a motion picture apparatus of the above character which is particularly easy for children to use.

Additional objects and features of the invention will appear from the following description in which the preferred embodiment is set forth in detail in conjunction with the accompanying drawings.

DESCRIPTION OF THE PREFERRED EMBODIMENT

Figure 1:
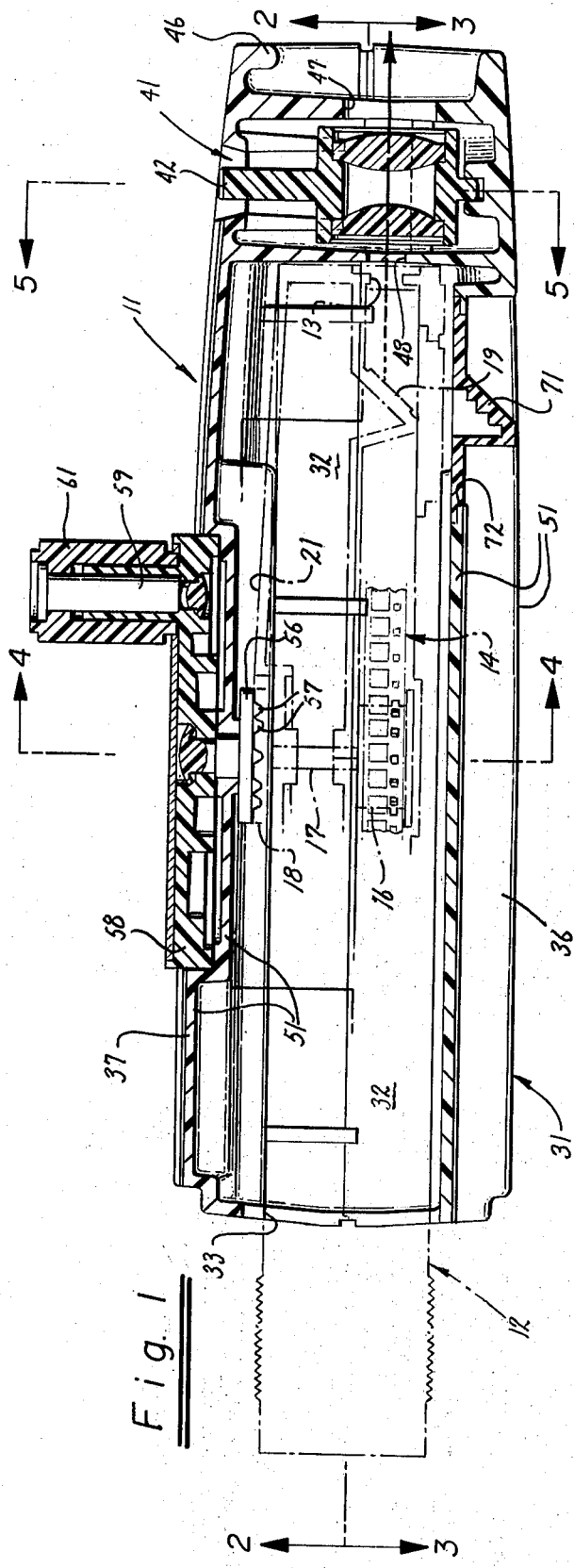
FIG. 1 is a cross sectional view of a motion picture apparatus incorporating the present invention.

The motion picture apparatus as shown in the drawings is in the form of a viewer 11 which is adapted to be utilized in conjunction with a removable cartridge 12. The cartridge 12 is of the type described in copending U.S. Pat. application Ser. No. 78,115, filed Oct. 5, 1970. As described therein, the cartridge or magazine 12 is provided with an aperture 13. A length of film 14 is disposed within the cartridge and is advanced by a sprocket 16. The sprocket 16 is connected by a shaft 17 to a driven member 18 carried exterior of the cartridge. The driven member 18 is utilized for driving the sprocket 16 to advance the film 14 past the aperture 13 provided in the cartridge. The cartridge is also provided with means for directing light onto the film in the aperture and consists of light directing means in the form of a mirror 19 disposed within the cartridge. The cartridge is formed with an inclined ramp 21 exterior of the cartridge which has its upper end adjacent the driven member 18.

The viewer 11 consists of a housing 31 which is provided with a cavity 32 that is accessible through an opening 33 in the rear of the housing to permit the cartridge 12 to be inserted into the cavity and removed from the cavity through the rear opening 33. The housing 31 is formed in two parts, 36 and 37, which are both basically halves of the housing. These parts 36 and 37 can be formed of any suitable material such as a plastic and the use of relatively simple molds. The parts 36 and 37 are fastened together by suitable means such as ultrasonic bonding. A lens assembly 41 is mounted in the housing and is provided with a knob 42 to permit focusing of the lens assembly. The housing 31 is formed with an eye piece 46 which is adapted to be placed adjacent the human eye. The eye piece 46 is provided with an opening 47 immediately in front of the lens assembly 41. The housing is also provided with an additional opening 48 to the rear of the lens assembly 41 and in alignment with the aperture 13 provided in the cartridge 12 when the cartridge 12 is inserted in the cavity provided in the housing 31.

The housing 31 is provided with a pair of spaced generally parallel side walls 51 and 52. A disc-like driven member 56 is carried by the side wall 51. The driven member 56 is disposed of within the cavity 32 and is generally parallel with the side wall 51. It is provided with a plurality of rounded bumps 57 which are arranged in a circle near the outer margin of the inner surface of the disc-like drive member 56. The bumps 57 are adapted to engage rounded depressions (not shown) provided in the driven member 18 of the cartridge 12. The drive member 56 is secured to a large disc 58 provided on the other side of the side wall 51 and is secured to the disc-like driving member 56 so that as the disc 58 is rotated, the drive member 56 is rotated. A pin 59 is mounted in the disc and carries a knob 61 which is rotatably mounted thereon. The knob 61 is adapted to be grasped by hand so that the disc 58 and the disc-like drive member 56 can be rotated.

Figure 6:
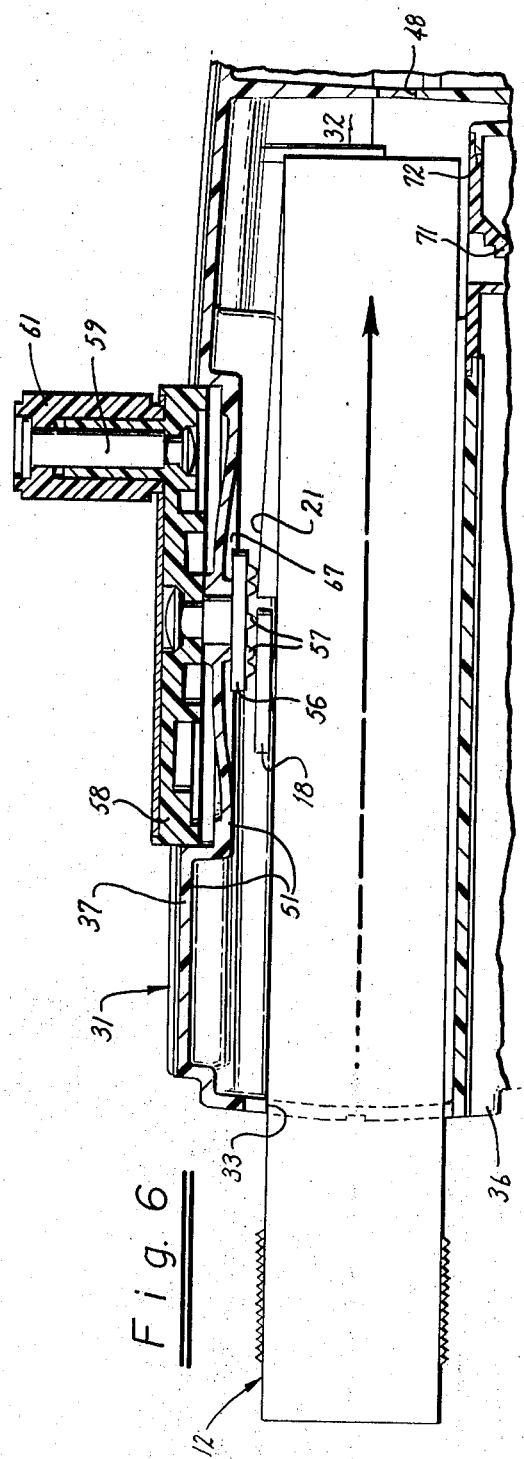
FIG. 6 is a cross sectional view similar to FIG. 1 showing a cartridge inserted in the motion picture apparatus and the manner in which the drive member carried by the housing is moved outwardly by the cartridge by deforming the side wall of the housing of the motion picture apparatus.
Figure 2:
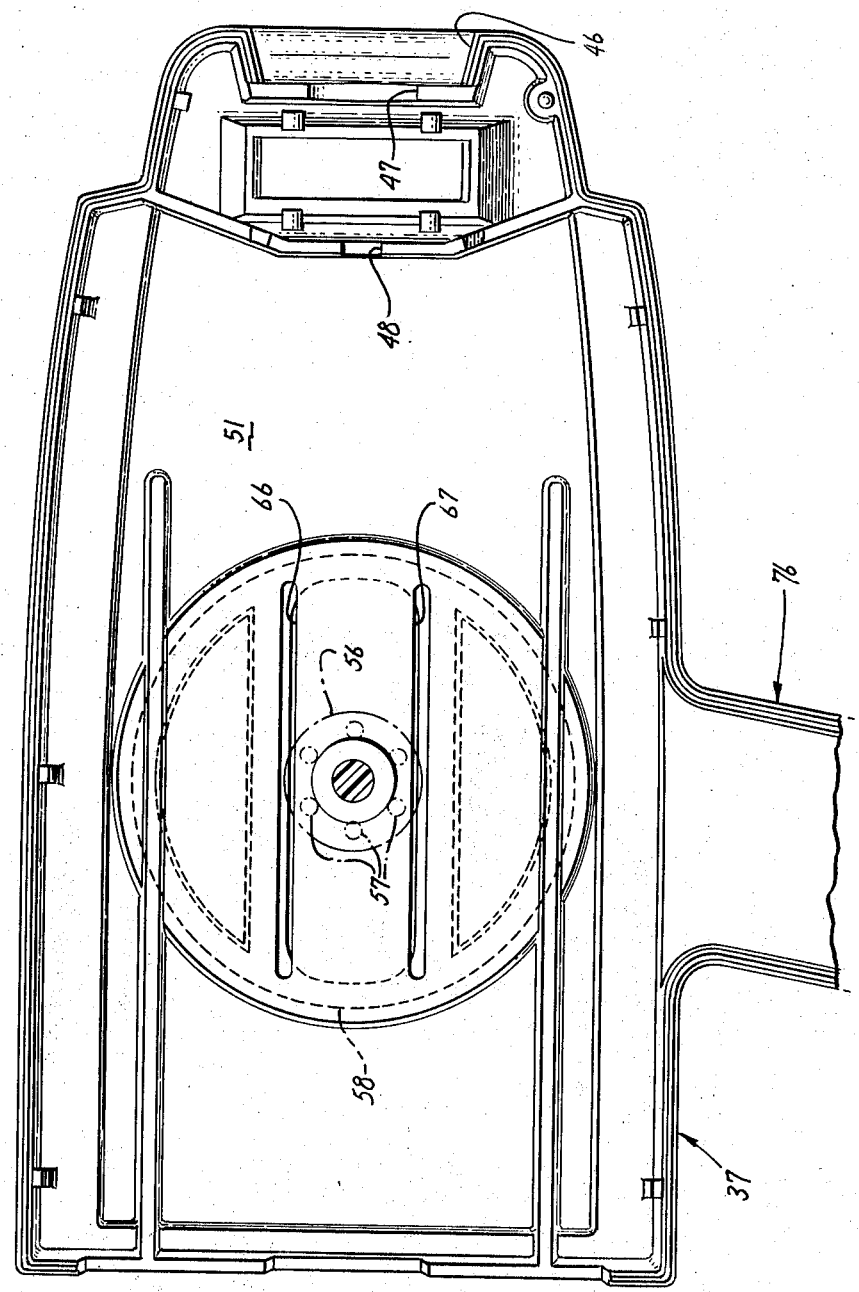
FIG. 2 is a cross sectional view taken along the line 2—2 of FIG. 1.
Figure 3:
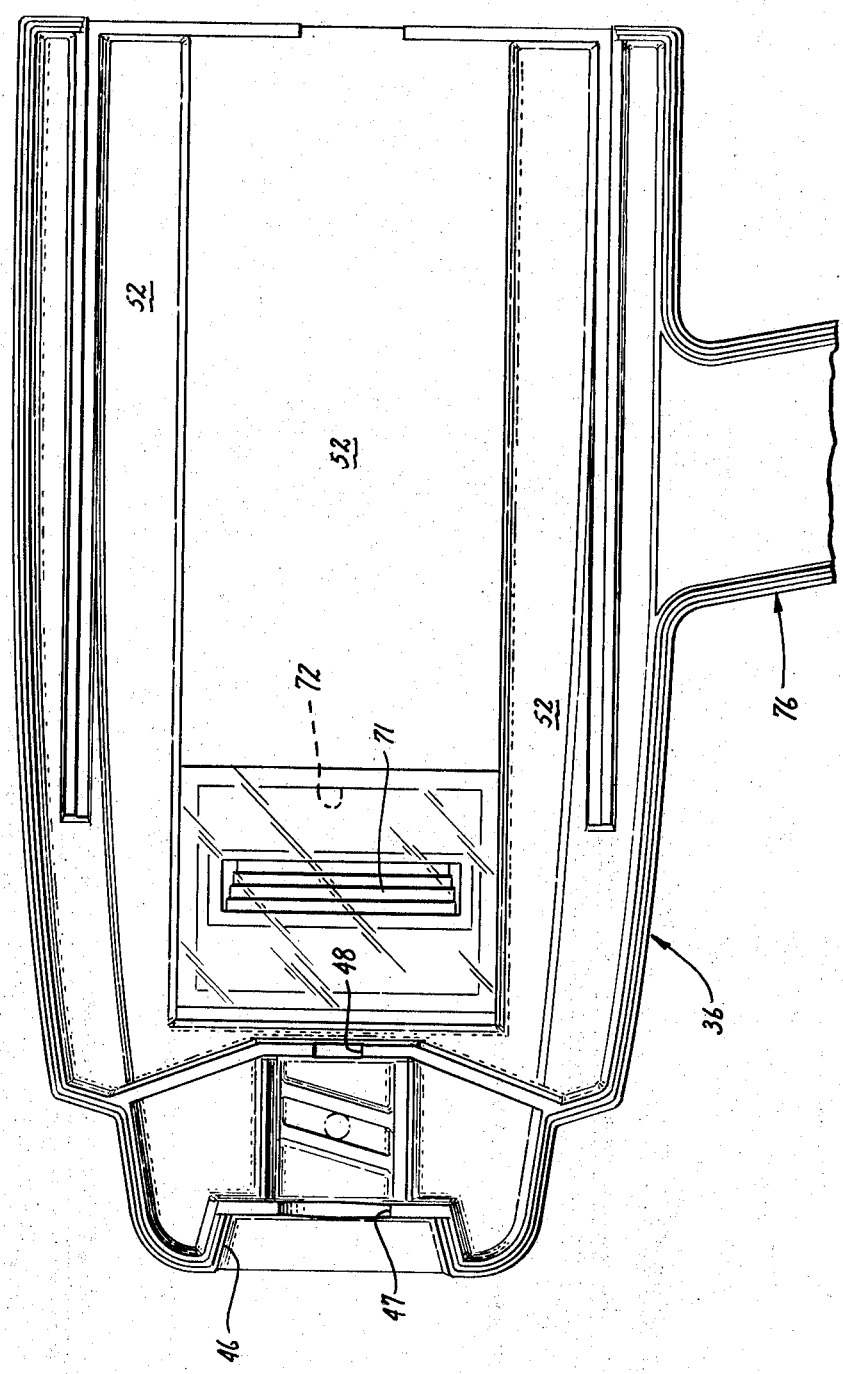
FIG. 3 is a cross sectional view taken along the line 3—3 of FIG. 1.
Figure 4:
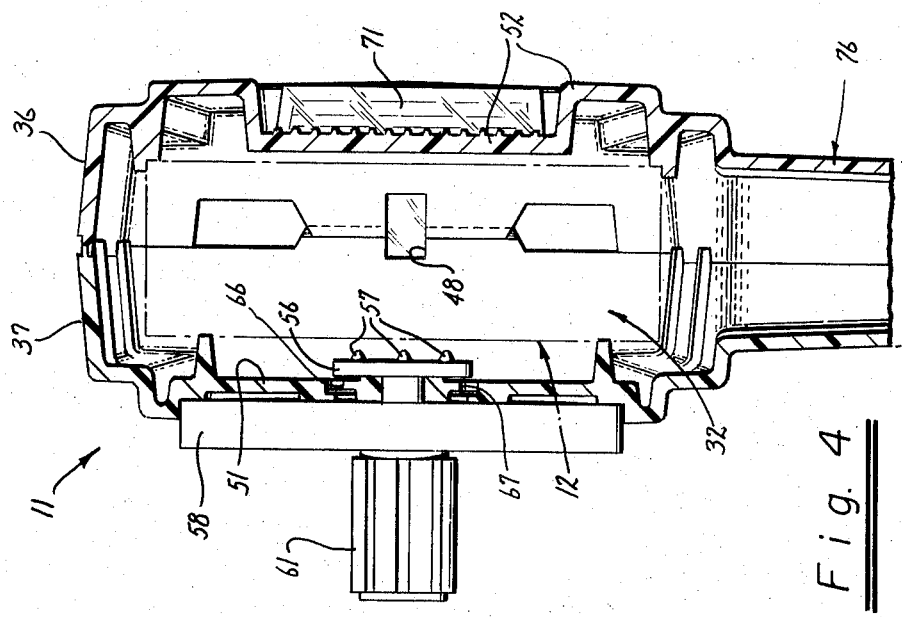
FIG. 4 is a cross sectional view taken along the line 4—4 of FIG. 1.
Figure 5:
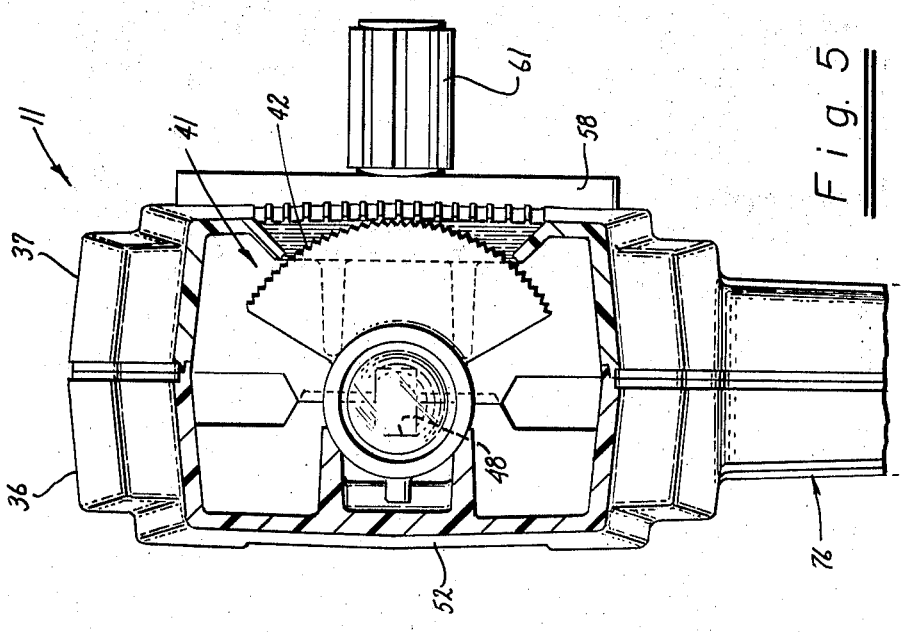
FIG. 5 is a cross sectional view taken along the line 5—5 of FIG. 1.

The portion of the side wall through which the disc-like member 56 extends is formed in such a manner so that it can be readily deformed outwardly as shown in FIG. 6. For this purpose, the side wall 51 has been weakened by forming a pair of elongate spaced generally parallel slots 66 and 67 extending longitudinally of the side wall 51 and positioned generally above and below the disc-like guide member 56 as shown particularly in FIG. 2. As can be seen from FIG. 2, the length of the slots are such so that they are covered by the large disc 58 and, thus, cannot be seen by the user of the viewer after it has been assembled. The wall thickness of the side wall 51, the length and width of the slots 66 and 67 should be such that the disc-like drive member 56 can be readily moved outwardly by deforming a portion of the side wall carrying the disc-like drive member 56 as shown in FIG. 6. As shown therein, the disc-like drive member 56 is engaged by the ramp 21 provided in the cartridge as the cartridge is moved to the right, as viewed in FIG. 6, to cause the disc-like drive member 56 to be moved outwardly and to deform the portion of the side wall carrying the same outwardly a sufficient distance so that the disc-like drive member 56 will readily clear the driven member 18 carried by the cartridge 12. Further insertion of the cartridge 12 permits the disc-like drive member 56 to clear the ramp 21 and permits the disc-like drive member 56 to engage the driven member 18. The handle or knob 61 can then be rotated to cause rotation of the drive member 56 which causes rotation of the driven member 18 which in turn causes the film 14 within the cartridge 12 to be advanced to permit viewing of the same.

With the foregoing construction, it can be seen that the cartridge 12 can be inserted with a straight line motion into the cartridge without the necessity of camming the same sideways to clear the disc-like drive member 56. Similarly, the cartridge 12 can be removed in a straight line motion. With the present construction, it has been found that the disc-like member 56 will readily separate from the driven member 18 so that it can be removed from the cavity 32 through the rear opening 33.

The apparatus is provided with the means for directing light onto the light directing surface in the form of the mirror 19 and consists of a Fresnal lens 71 which receives light from the rear through a recess 72 provided in the side wall 52 and extending longitudinally of the side wall 52. The light received by the lens 71 is directed toward the mirror 19 onto the film 14 in front of the aperture. The housing 31 is provided with a pistol-type grip 76 so that the viewer 11 can be held by one hand while the other hand is used to operate the knob 61 to rotate the disc-like drive member 56.

It is apparent from the foregoing that there has been provided a new and improved motion picture apparatus in the form of a viewer in which the means provided for maintaining the drive member carried by the housing and the driven member carried by the cartridge in engagement with each other have been greatly simplified by the elimination of parts and a simplified construction. In addition, the construction of the motion picture apparatus is such that the cartridge can be readily inserted into the apparatus and readily removed from the apparatus, even by small children.

I claim:

1. In a motion picture apparatus for use with a removable cartridge of the type having an aperture, a length of film disposed in the cartridge, means including a driven member exterior of the cartridge for advancing the film past the aperture in the cartridge said motion picture apparatus comprising, a housing having a cavity formed therein with a rear opening in communication with the cavity whereby the cartridge can be inserted into the cavity and removed from the cavity through the rear opening, an optical assembly mounted in the housing in front of the aperture in the cartridge when the cartridge is in the cavity to form an optical image of the film as it is advanced in the cartridge, said housing having a side wall, a drive member within the cavity carried by a portion of the side wall of the housing, said portion being formed integral with said side wall and deformable with respect to said side wall so that the portion of the side wall carrying the drive members may be deformed outwardly whereby the driven member carried by the cartridge may be moved over the drive member and into engagement with the drive member so that the drive member drives the driven member as the drive member is rotated the cavity being of a size so that the driven member cannot be moved over the drive member without deforming said portion outwardly.

2. Apparatus as in claim 1 wherein said has been weakened side wall to permit the portion of the side wall carrying the drive member to be deformed.

3. Apparatus as in claim 1 together with at least one slot formed in the side wall adjacent the drive member and having as its sole function facilitating the deformation of the portion of the side wall carrying the drive member.

4. Apparatus as in claim 1 wherein said side wall is formed with at least two generally spaced parallel elongate slots disposed adjacent the drive member and having as their sole function facilitating the deformation of the portion of the side wall carrying the drive member.

5. Apparatus as in claim 4 wherein said at least two slots extend generally longitudinally of the housing.

6. Apparatus as in claim 5 together with a disc secured to said drive member, said disc being disposed exterior of said side wall and having such a size so that it generally covers and overlies said slots.

* * * * *